United States Patent
Xia et al.

(10) Patent No.: US 10,291,008 B2
(45) Date of Patent: May 14, 2019

(54) MOISTURE-RESISTANT HIGH STRENGTH SEALING MATERIAL SEALED DOWNHOLE ELECTRICAL FEEDTHROUGH AND METHODS OF MAKING THE SAME

(71) Applicant: PA&E, Hermetic Solutions Group, LLC, Wenatchee, WA (US)

(72) Inventors: Hua Xia, Huffman, TX (US); Nelson Settles, East Wenatchee, WA (US); Tucker Havekost, Leavenworth, WA (US); Don Larson, Wenatchee, WA (US)

(73) Assignee: PA&E, HERMETIC SOLUTIONS GROUP, LLC, Wenatchee, WA (US)

( * ) Notice: Subject to any disclaimer, the term of this patent is extended or adjusted under 35 U.S.C. 154(b) by 126 days.

(21) Appl. No.: 15/592,725

(22) Filed: May 11, 2017

(65) Prior Publication Data
US 2018/0331464 A1    Nov. 15, 2018

(51) Int. Cl.
*H01R 13/405* (2006.01)
*H02G 15/013* (2006.01)

(52) U.S. Cl.
CPC ............................. *H02G 15/013* (2013.01)

(58) Field of Classification Search
CPC .. H02G 15/013; H01B 17/303; H01B 17/305; H01R 9/032; H01R 13/521
USPC ........................................................ 439/736
See application file for complete search history.

(56) References Cited

U.S. PATENT DOCUMENTS

| | | | |
|---|---|---|---|
| 4,445,744 A * | 5/1984 | Sedig | H01R 13/521 439/271 |
| 5,017,740 A | 5/1991 | Honkomp et al. | |
| 6,957,981 B2 | 10/2005 | Karino et al. | |
| 7,168,984 B2 | 1/2007 | Perle et al. | |
| 7,364,451 B2 | 4/2008 | Ring et al. | |
| 7,901,247 B2 | 3/2011 | Ring | |
| 8,082,663 B1 | 12/2011 | Monroe et al. | |
| 9,553,398 B2 | 1/2017 | True et al. | |
| 9,966,169 B1 * | 5/2018 | Xia | H01B 17/305 |

(Continued)

*Primary Examiner* — Jean F Duverne
(74) *Attorney, Agent, or Firm* — Patentfile, LLC; Bradley C. Fach; Steven R. Kick

(57) ABSTRACT

A downhole electrical feedthrough package and method for making the same. The feedthrough package may include a metal shell forming a shell conduit. A metal web may be coupled to the metal shell, and the metal web may form a web conduit. A conducting pin may extend through the shell conduit and web conduit. A dielectric seal may electrically isolate the conducting pin from the metal web. The dielectric seal may be formed by a bismuth glass based dielectric sealing material system having at least two of the four components selected from $Bi_2O_3$, $B_2O_3$, MO, and optionally REO forming a bismuth glass system. MO may be selected from ZnO, BaO, $TiO_2$, and $Fe_2O_3$, and their glass making pre-cursors. REO may be selected from $CeO_2$, $Y_2O_3$, $Sc_2O_3$, $Nd_2O_3$, $Pr_2O_3$, and lanthanum series oxides. One or more isolators may be disposed within the shell conduit proximate to the dielectric seal and surrounding a portion of the conducting pin.

9 Claims, 14 Drawing Sheets

(56) References Cited

U.S. PATENT DOCUMENTS

2003/0104727 A1\* 6/2003 Chen ................ H01R 9/032
              439/607.48
2019/0027914 A1\* 1/2019 Xia ................ H01B 17/303

\* cited by examiner

MOISTURE-RESISTANT HIGH STRENGTH SEALING MATERIAL SEALED DOWNHOLE ELECTRICAL FEEDTHROUGH AND METHODS OF MAKING THE SAME

FIELD OF THE INVENTION

This patent specification relates to the high strength dielectric sealing material sealed electrical feedthrough package in general, and to the moisture-resistant dielectric sealing material sealed downhole electrical feedthrough in particular for enabling downhole logging tools, LWD and MWD tools reliable operation in water-based or moisture-rich oil-based wellbores.

BACKGROUND

Electrical feedthroughs are used to connect an electrical power source to downhole logging tools and the like which determine physical, chemical, and structural properties of the formation. However, a downhole environment is subjected to a variety of harsh liquid environments such as brine, gas, and oil fluid that often contains water and moisture. An electrical feedthrough typically comprises metal pin(s), sealed in an insulating material which may carry substantial amounts of power with signals up to a few thousand volts that requires a high insulation resistance. It is clear that if the moisture is permitted to pass into the downhole logging tool enclosure due to failed hermetic seal of the feedthrough, it may lead to catastrophic electrical breakdown.

Downhole logging tool and electrical circuits are packaged in a hermetically-sealed metal enclosure, which is either pressurized, or filled with fluid, to protect the circuits from downhole corrosive environment and humidity. The sealed tool enclosure uses an electrical feedthrough that transmits the power to inside electronics or sends the measured downhole data to surface instruments. For permanent installations in the downhole environment, it is important that these electrical feedthroughs are reliable. In particular, it is important that the downhole fluid is prevented downhole fluid and moisture from penetrating the electrical feedthroughs because the presence of the conductive fluid, such as seawater or brine in the electrical feedthroughs can cause a short circuit in the system. In one case, a sealing material may be of high dielectric strength but lack of mechanical strength and appropriate coefficient of thermal expansion that may lead to sealing material cracks by high stress. In another case, a sealing material may be of high mechanical strength and a matched coefficient of thermal expansion to metal enclosure but lack of sufficient electrical insulation to survive downhole temperature and pressure without failures. In also further case, a sealing material may have high dielectric and mechanical strength and also matched coefficient of thermal expansion to metal enclosure but lack of moisture resistance that could also lead to electrical breakdown by moisture deteriorated electrical resistivity.

Aromatic polyether ketones (PEEK, PEK, PAEK, and PEKK) based organic polymers are first type of dielectric sealing materials that widely used in an electrical feedthrough seal for subsea and downhole logging tools. Typically, in low temperature installations, aromatic polyether ketones based polymer materials are used as the pressure barrier and insulating component. However, the structural integrity as well as the dielectric strength of aromatic polyether ketones can be compromised at higher temperatures because of low glass transition temperature of $T_g < 150°$ C. Under long-term exposure to high pressure and temperature and corrosive fluids and frequent thermal cycles during the deployment from downhole to surface, the hermetic seals will eventually fail, at least allowing fluid and moisture to enter the pressure bulkhead and reach the contact pins. If the invading fluid is conductive, which is usually the case in downhole and subsea environments, a short circuit may occur in the logging tool system, resulting in power and data loss. One the other hand, although these thermoplastic materials have high dielectric strength, their ambient water absorption of ~0.5% could slowly degraded under moisture-rich downhole or subsea environment, even without moisture passing through the conducting pin surface.

Inorganic glasses and glass-ceramics (Corning 7070, 58061, EG2927, $Li_2O$—$Al_2O_3$—$SiO_2$, $MgO$—$Al_2O_3$—$SiO_2$, and $ZnO$—$Al_2O_3$—$SiO_2$ etc.) are second type of dielectric sealing materials that have high dielectric strength, electric resistivity, mechanical strength, and break-down voltage. Despite a great success in many glass-to-metal seal systems, these glass and glass-ceramic sealed electrical feedthroughs often failed not due to mechanical stress but due to the deterioration of the electric insulation. One failure mode is that the sealing material is of a hydrophilic nature due to its porosity that leads to absorption of moisture or water and eventual short circuit. There is still a need for developing a high moisture resistant dielectric sealing material sealed electrical feedthrough that enables reliable operation under 30,000 PSI/200° C. hostile water-based or moisture-rich downhole and subsea environments.

It is desirable for having a high mechanical strength and high dielectric strength with moisture-resistant dielectric sealing material for downhole electrical feedthrough package that not only provides high glass-to-metal seal strength against potential mechanical failures but also provides high electrical insulation against potential electrical failures even at moisture-rich downhole environment. The present invention relates to the high strength dielectric sealing material sealed electrical feedthrough package in general, and to the moisture-resistant dielectric sealing material sealed downhole electrical feedthrough in particular for enabling downhole logging tools, LWD and MWD tools reliable operation in water-based or moisture-rich oil-based wellbores.

BRIEF SUMMARY OF THE INVENTION

A downhole electrical feedthrough package, having a novel moisture-resistant dielectric sealing material, and method for making the same are provided. In some embodiments, the feedthrough package may include a metal shell forming a shell conduit. A metal web may be coupled to the metal shell, and the metal web may form a web conduit. A conducting pin may extend through the shell conduit and web conduit. A dielectric seal may electrically isolate the conducting pin from the metal web. The dielectric seal may be formed by a bismuth glass based dielectric sealing material system having at least two of the four components selected from $Bi_2O_3$, $B_2O_3$, MO, and optionally REO forming a bismuth glass based dielectric sealing material system. A first isolator may be disposed within the shell conduit proximate to a front side of the dielectric seal and surrounding a portion of the conducting pin, and a second isolator may be disposed within the shell conduit proximate to a rear side of the dielectric seal and surrounding a portion of the conducting pin.

According to another embodiment consistent with the principles of the invention, a method of forming a downhole electrical feedthrough package having a novel moisture-resistant dielectric sealing material is provided. In some embodiments, the method may include the steps of combining at least two of the four components selected from $Bi_2O_3$, $B_2O_3$, MO, and optionally REO to form a glass mixture; heating the glass mixture to approximately 650 to 1400° C.; quenching the heated glass mixture in de-ionized water bath to form glass frits; sintering the glass frits with hollow cylinder shape and fitted into a conduit of a metal shell to form an electrical feedthrough assembly; firing the electrical feedthrough assembly at first temperature ($T_1$) for a first time period to form a dielectric seal and to provide a first thermal energy to the dielectric seal; heating the electrical feedthrough assembly at second temperature ($T_2$) for a second time period to provide a second thermal energy to the dielectric seal; cooling the dielectric seal of the electrical feedthrough assembly to ambient temperature for a third time period; and integrating two isolators into the conduit so that the dielectric seal is in contact with at least one of the isolators.

In further embodiments, the bismuth glass based dielectric sealing material system may comprise binary $Bi_2O_3$-MO compositions, in which MO may be selected from the ZnO, BaO, $TiO_2$, and $Fe_2O_3$, and their glass making pre-cursors.

In further embodiments, the bismuth glass based dielectric sealing material system may comprise ternary $Bi_2O_3$—$B_2O_3$-MO compositions, in which MO may be selected from the group consisting of ZnO, BaO, $TiO_2$, $Fe_2O_3$, and their glass making pre-cursors.

In further embodiments, the bismuth glass based dielectric sealing material system may comprise quaternary $Bi_2O_3$—$B_2O_3$-MO-REO compositions, in which MO may be selected from ZnO, BaO, $TiO_2$, $Fe_2O_3$, and their glass making precursors, and REO may be selected from $CeO_2$, $Y_2O_3$, $Sc_2O_3$, $Nd_2O_3$, $Pr_2O_3$, and lanthanum series oxides.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1A:
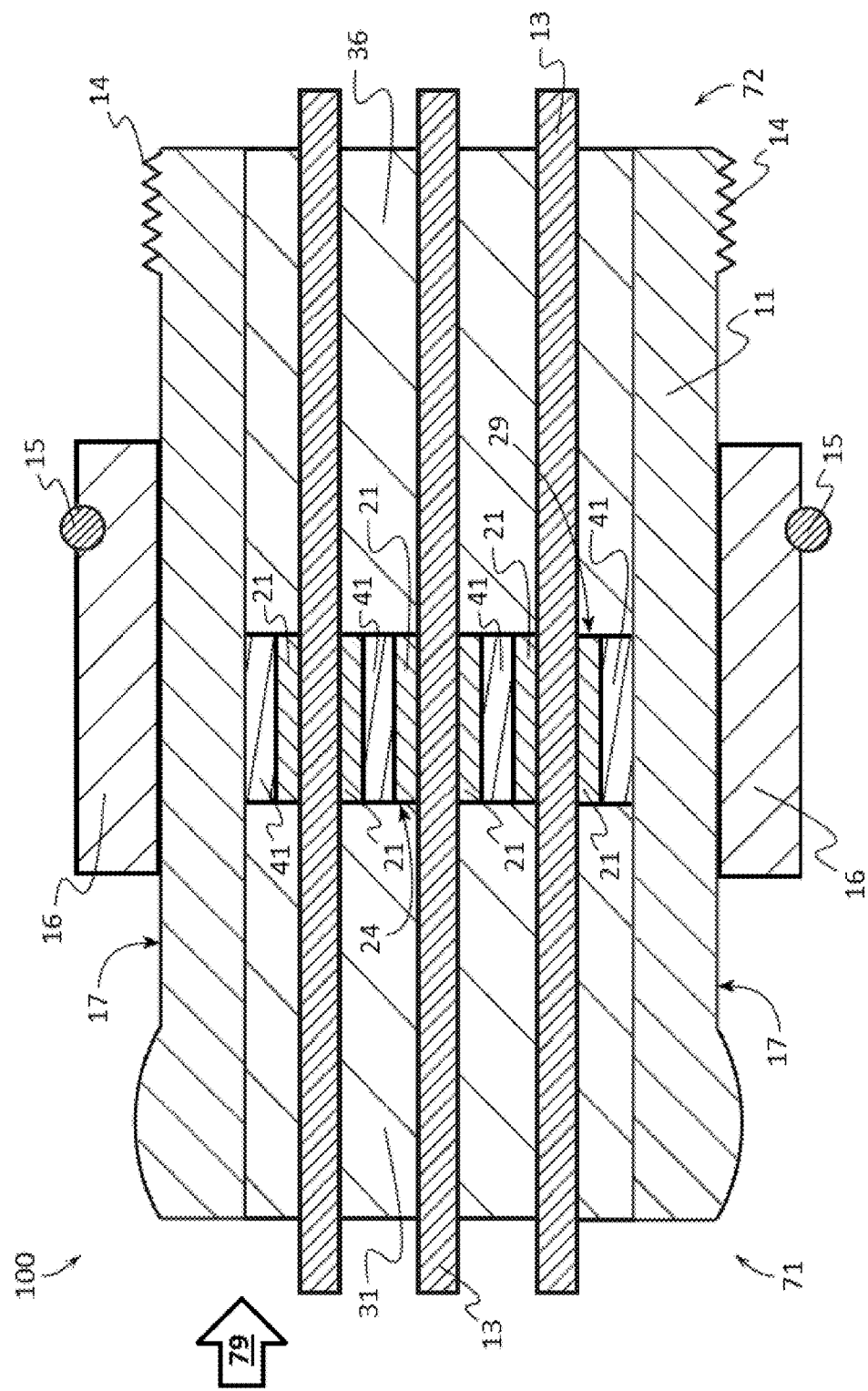
FIG. 1A depicts a sectional view of an example of an electrical feedthrough comprising a high moisture-resistant dielectric sealing material according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In this invention, the glass compositions and the method of manufacture of glass compositions describe the mixing of oxides to create the resultant glass composition. It will be understood that many other compounds, other than the oxides mentioned, and the pure elements can be used as glass making precursors to create the resultant desired glass composition. For example, if the bismuth oxide is a component of the glass, bismuth, bismuth carbonate, bismuth nitrate, bismuth hydroxide, bismuth ammoniate, bismuth hydride, or any other similar bismuth compound, either singularly, or in any combination, can be used as precursors to create the resultant desired glass composition. Accordingly, for the sake of clarity, this description will refrain from repeating every possible combination of the glass making precursors in an unnecessary fashion. Nevertheless, the specification and claims should be read with the understanding that such combinations are entirely within the scope of the invention and the claims.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

In some embodiments, a surface or element may be positioned proximate to another surface or element so that the two surfaces or elements are in contact with each other. In other embodiments, a surface or element may be positioned proximate to another surface so that the two surfaces or element are not in contact with each other but are between 0.0001 to 10.0 millimeters from each other.

New high dielectric strength with moisture-resistant dielectric sealing material sealed electrical feedthroughs and methods are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1B:
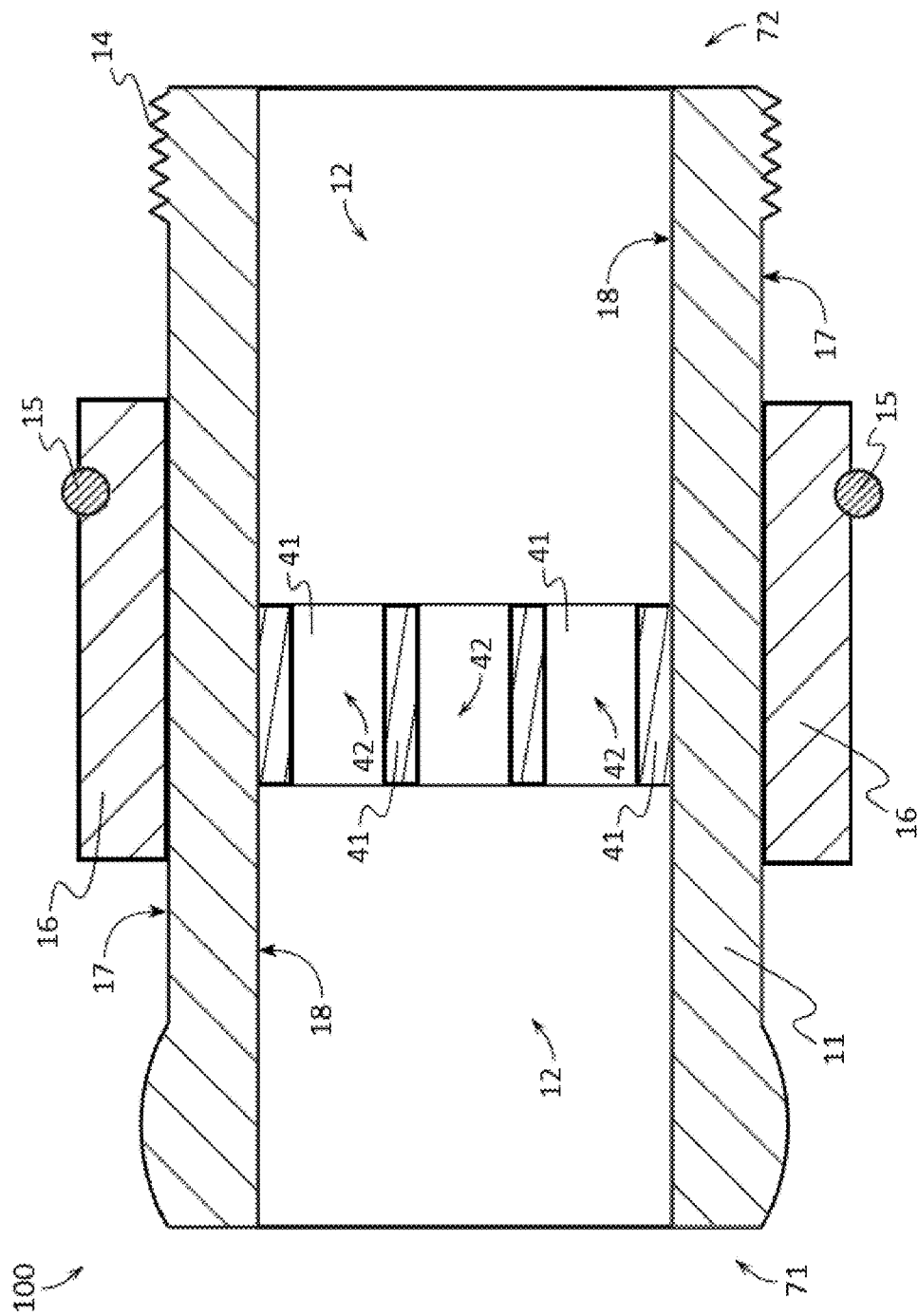
FIG. 1B shows a sectional view of an example of a downhole electrical feedthrough without dielectric material to illustrate the relationship between the shell conduit and web conduits disposed in the metal shell according to various embodiments described herein.
Figure 2:
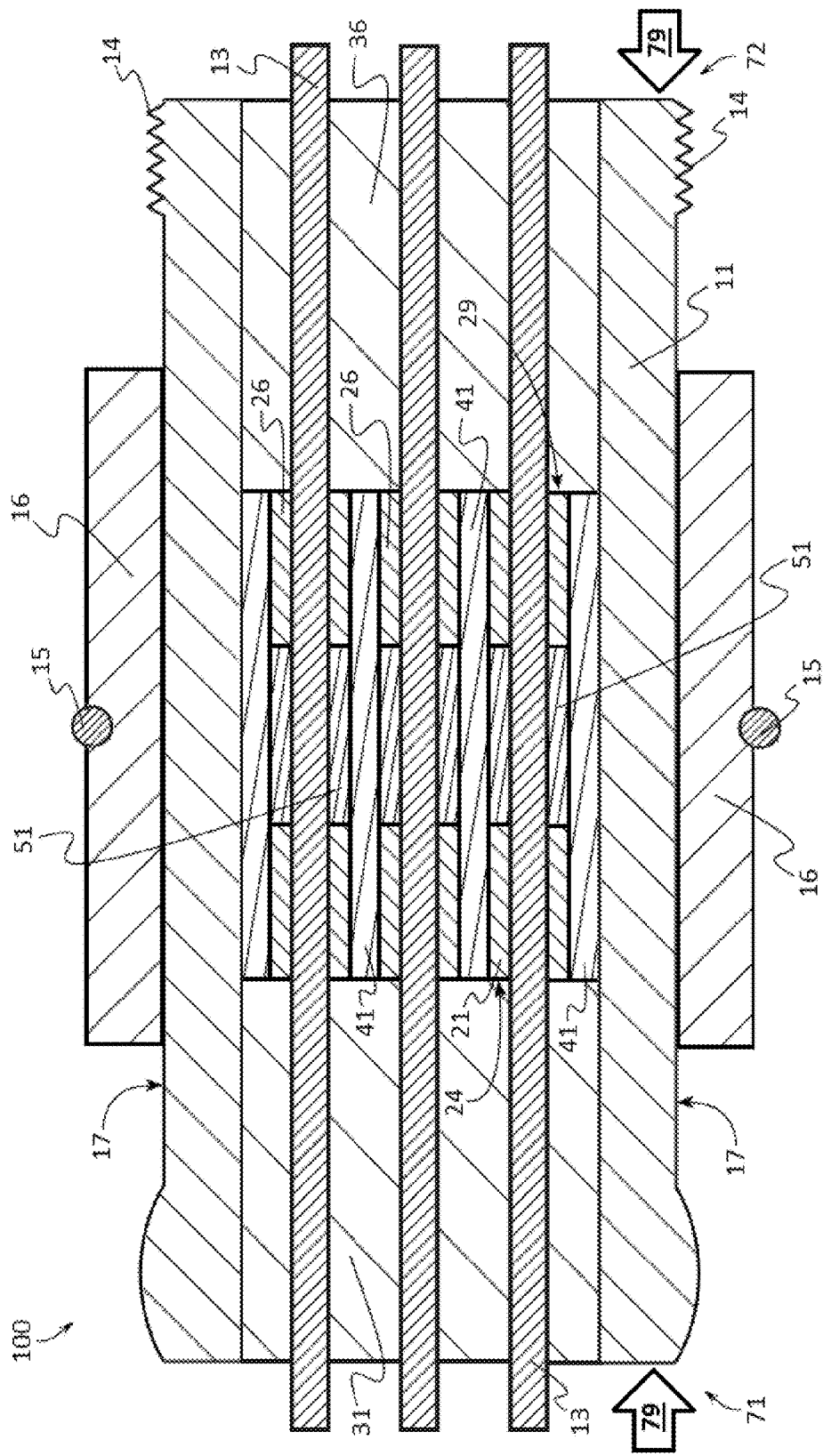
FIG. 2 illustrates a sectional view of another example of a downhole electrical feedthrough comprising a high moisture-resistant dielectric sealing material according to various embodiments described herein.

The present invention will now be described by example and through referencing the appended figures representing preferred and alternative embodiments. FIGS. 1A, 1B, and 2 illustrate examples of a downhole electrical feedthrough ("the feedthrough") 100 according to various embodiments. In some embodiments, the feedthrough 100 may comprise a metal shell 11 forming a shell conduit 12. A metal web 41 may be coupled to the metal shell 11 within the shell conduit 12, and the metal web 41 may form one or more web conduits 42. One or more conducting pins 13 may extend through the shell conduit 12 and through a web conduit 42. One or more dielectric seals 21, 26, may also be disposed in the conduit 12, and each dielectric seal 21, 26, may electrically isolate one or more conducting pins 13 from the metal web 41. One or more isolators 31, 36, may also be disposed within the conduit 12, and each isolator 31, 36, may surround a portion of each conducting pin 13 disposed in the conduit 12 and electrically isolate the one or more conducting pins 13 from the metal shell 11. Each isolator 31, 36, may be positioned in contact with a dielectric seal 21, 26, thereby forming a vibration dampening junction 24, 29, at the interface of an isolator 31, 36, with a dielectric seal 21, 26. Optionally, the feedthrough 100 may comprise one or more ceramic sleeves 51 which may be disposed in the web conduit 42, and each ceramic sleeve 51 may also electrically isolate one or more conducting pins 13 from a portion of the metal web 41.

Referring to the example shown in FIG. 1A, in some embodiments, a feedthrough 100 may be configured as a single-directional connector suitable for enduring hydraulic pressure 79 from the front end 71. The feedthrough 100 may comprise one or more, such as seven, conducting pins 13 which may be extend through the conduits 12, 42. A portion of each conducting pin 13 may be surrounded by a dielectric seal 21, and each dielectric seal 21 may electrically isolate its respective conducting pin 13 from all or a portion of the metal web 41. A first isolator 31 may be disposed within a conduit 12, and the first isolator 31 may surround a portion of each conducting pin 13 disposed in the conduit 12 proximate to the front end 71. The first isolator 31 may be positioned in contact with the surface of the dielectric seals 21 that is facing the front end 71 thereby forming a first vibration dampening junction 24 at the interface of each dielectric seal 21 with the first isolator 31. A second isolator 36 may also be disposed within the conduit 12, and the second isolator 36 may surround a portion of each conducting pin 13 disposed in the conduit 12 proximate to the rear end 72. In some embodiments, the metal shell 11 may comprise or be made from titanium alloys, stainless steel alloys, Nitronic alloys, Inconel alloys, and any other metal alloys preferably with a minimum chromium content substantially of 10.5%.

In some embodiments, dielectric seals 21 which may insulate the conducting pins 13 from all or portions of the metal web 41 may be positioned centrally within a web conduit 42. In some embodiments, the feedthrough 100 may comprise a flange 16 which may be positioned substantially centrally on the outer surface 17 of the metal shell 11 and dielectric seals 21 which may insulate the conducting pins 13 from the metal web 41 may be positioned centrally within the web conduit 42. In other embodiments, and as shown in FIG. 1, a flange 16 may be positioned substantially centrally on the metal shell 11 and dielectric seals 21 which may insulate the conducting pins 13 from the metal web 41 may be positioned closer to one end 71, 72, such as closer to the rear end 72, that is to be subjected to hydraulic pressure. In further embodiments, the isolators 31, 36, may be substantially the same size, while in other embodiments, one isolator 31, 36, such as the isolator 36 that is to be subjected to hydraulic pressure 79, may be smaller than the other isolator 31.

Turning now to the example shown in FIG. 2, in some embodiments, a feedthrough 100 may be configured as a bi-directional connector suitable for enduring hydraulic pressure 79 to both ends 71, 72. The feedthrough 100 may comprise one or more, such as seven, conducting pins 13 which may be extend through the conduits 12, 42. A portion of each conducting pin 13 may be surrounded by a ceramic sleeve 51, and each ceramic sleeve 51 may electrically isolate its respective conducting pin 13 from a portion of the metal web 41. A portion of each conducting pin 13 may also be surrounded by a first dielectric seal 21, and each first dielectric seal 21 may electrically isolate its respective conducting pin 13 from a portion of the metal web 41. A portion of each conducting pin 13 may also be surrounded by a second dielectric seal 26, and each second dielectric seal 26 may electrically isolate its respective conducting pin 13 from a portion of the metal web 41. A first isolator 31 may be disposed within the conduit 12, and the first isolator 31 may surround a portion of each conducting pin 13 disposed in the conduit 12 proximate to the front end 71. The first isolator 31 may be positioned proximate or in contact with the surface of each of the first dielectric seals 21 that is facing the first end 71 thereby forming a first vibration dampening junction 24 at the interface of each first dielectric seal 21 with the first isolator 31. A second isolator 36 may also be disposed within the conduit 12, and the second isolator 36 may surround a portion of each conducting pin 13 disposed in the conduit 12 proximate to the rear end 72. The second isolator 36 may be positioned proximate or in contact with the surface of each of the second dielectric seals 26 that is facing the rear end 72 thereby forming a second vibration dampening junction 29 at the interface of each second dielectric seal 26 with the second isolator 36. In further embodiments, a ceramic sleeve 51 may comprise or be formed from any fine ceramics (also known as "advanced ceramics") that do not conduct electricity and which preferably have resistance to acid, alkali, organic solvents, and/or water, including higher strength ceramic material such as a zirconia, alumina, and steatites.

The feedthrough 100 may comprise one or more conducting pins 13 which may be used to conduct electricity through the feedthrough 100. A conducting pin 13 may comprise an electrically conductive material which may be used to communicate electricity through the conduit of the feedthrough 100. In some embodiments, a conducting pin 13 may be made from titanium alloys, copper alloys, Beryllium copper (BeCu) alloys, chromium copper (CrCu) alloys, Brass, Inconel alloys, Alloy 52, other nickel-iron alloys, Kovar alloy, and other nickel-cobalt ferrous alloys. In other embodiments, a conducting pin 13 may be made from or comprise any other electrically conductive material.

An isolator 31, 36, may comprise an electrically non-conductive material which may be used to prevent the communication of electricity through the entire length of the conduit or through the metal shell 11 of the feedthrough 100. In some embodiments, an isolator 31, 36, may be made from or comprise thermoplastic aromatic polyether ketones, such as polyamide-imide (PAI), polyether ether ketone (PEEK), PolyEtherKetone (PEK), polyaryletherketone (PAEK), and Polyetherketoneketone(PEKK), based organic polymers. In preferred embodiments, an isolator 31, 36, may be made from or comprise high-temperature PAI or glass-reinforced PAI thermoplastic material. In further embodiments, an isolator 31, 36, may be made from or comprise a PAI thermoplastic and a PEEK thermoplastic. In alternative embodiments, isolator 31, 36, may be made from or comprise any engineered polymer with high-temperature (greater than 220 degrees Celsius) and high compression strength (greater than 180 kPa). On the other hand, these isolators 31, 36, may be used as a vibration damper against unexpected mechanical shock especially during installation process or operation in the lateral or horizontal wells, or reduce package deformation that frequently causes glass cracks in the glass-to-metal (dielectric seal 21, 26, to metal web 41 or metal shell 11) sealing body. Additionally, isolators 31, 36, may function also as a mechanical seal in the feedthrough 100 to block potential downhole fluid leaked from a failed mechanical seal, such as threading 14 or exterior seals 15, from contacting a glass-to-metal sealing body. Since a PAI or PEEK based thermoplastic polymer has high continuous operation temperature of 260° C., it may be used in isolators 31, 36, for long-term downhole operation.

A dielectric seal 21, 26, may comprise an electrically non-conductive material which may be used to prevent the communication of electricity through the entire length of the conduit or through the metal shell 11 of the feedthrough 100. Generally, "sealing material" or "dielectric sealing material" may refer to the material as dielectric seal 21, 26, may be formed with high mechanical strength and dielectric strength in general. A dielectric seal 21, 26, may also preferably be made from or comprise glass or glass-ceramic that has not only high mechanical strength and dielectric strength but also has high moisture resistance for HPHT downhole environmental deployment. Thermoplastic PEEK based sealing material could provide acceptable mechanical strength, high dielectric strength but it still has low water absorption of ~0.5% even at ambient condition (immersion PEEK in water at 23 degrees Celsius for 24 hrs, see ASTM D570), which is undesirable for long-term being used in water-based or moisture-rich downhole and subsea.

In some embodiments, the dielectric seal 21, 26, may be made from a bismuth glass based dielectric sealing material system. A bismuth glass based dielectric sealing material system may be or comprise a binary dielectric bismuth glass system, or a ternary dielectric bismuth glass system, or a quaternary dielectric bismuth glass system. A binary dielectric bismuth glass system may comprise $Bi_2O_3$-MO with MO=ZnO, BaO, $TiO_2$, $Fe_2O_3$. A ternary dielectric bismuth glass system may comprise $B_2O_3$—$Bi_2O_3$-MO with MO=ZnO, BaO, $TiO_2$, $Fe_2O_3$.

In more specific embodiments, the dielectric seal 21, 26, may be made from a bismuth glass based dielectric sealing material system. A bismuth glass based dielectric sealing material system may be or comprise a quaternary dielectric bismuth glass system comprising $B_2O_3$—$Bi_2O_3$-MO-REO with MO=ZnO, BaO, $TiO_2$, $Fe_2O_3$ and REO=lanthanum series based rare earth oxide oxides (REO) in which the REO enhanced the moisture resistance by increased hydrophobicity of the glass system. The use of REO in the glass system enhances the moisture resistance of the glass system based on the REO in inhibiting hydrogen bonding with interfacial water molecules resulting in a hydrophobic hydration structure. In fact, the REO has a low surface fee energy that water will bead up at its surface, which makes them attractive for repelling water or conductive scaling and fouling onto the sealing material surface.

In some embodiments, a dielectric bismuth glass system may comprise B2O3 between 0 mol % and 40 mol %. In some embodiments, a dielectric bismuth glass system may comprise REO between 0 mol % and 15 mol %. In some embodiments, a dielectric bismuth glass system may comprise MO between 0 mol % and 35 mol %. In some embodiments, a dielectric bismuth glass system may comprise Bi2O3 between 20 mol % and 60 mol %. In some embodiments, a dielectric bismuth glass system may comprise a glass transition temperature of approximately from 350 C to 480 C, coefficient of thermal expansion from 8.0 10-6 m/m K to 12 10-6 m/m K, Young's modulus from 50 GPa to 65 GPa, a mass density of approximately from 5.5 g/cm3 to about 7.0 g/cm3, and resistivity from $1.0 \times 10^{11}$ Ω-cm to $1.0 \times 10^{14}$ Ω-cm.

Figure 3:
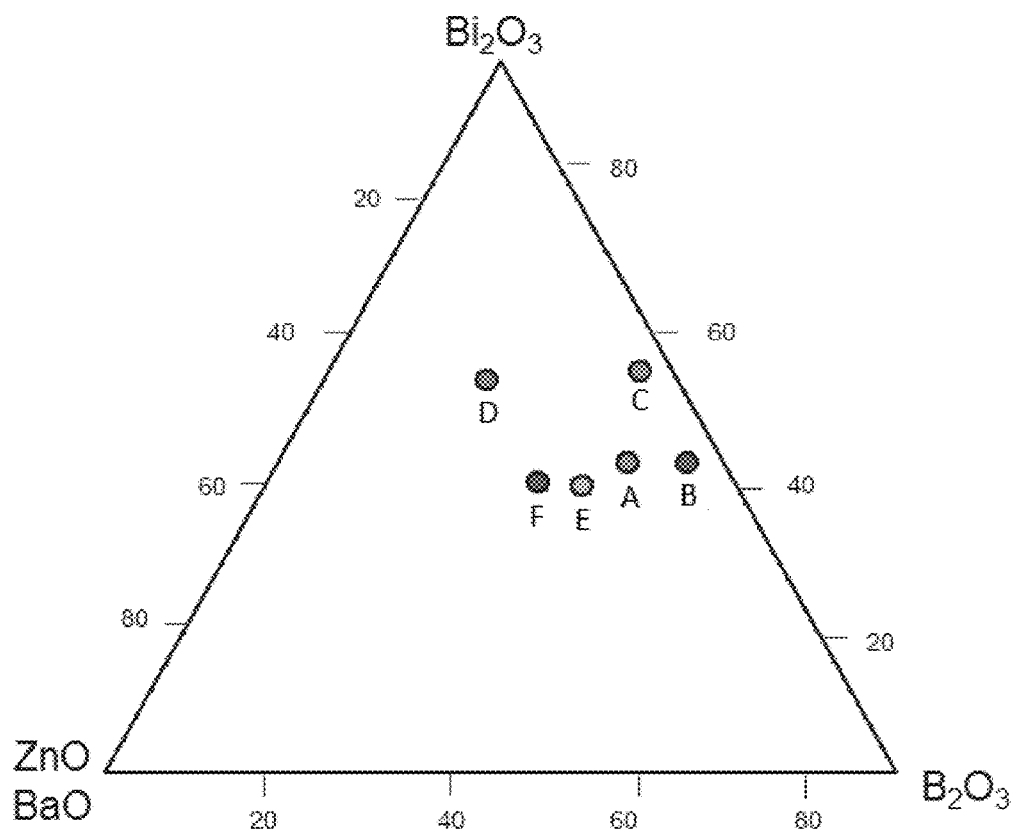
FIG. 3 depicts a triangulation phase diagram for making exemplary high moisture-resistant dielectric sealing materials according to various embodiments described herein.

To make up above binary, ternary and quaternary bismuth sealing glass systems, FIG. 3 has provided a glass system composition triangulation phase diagram for explaining how to obtain exemplary dielectric sealing materials having high electrical resistivity and hydrophobicity to be used as a dielectric seal 21, 26. The glass system compositions may be based on glass former(s) and network modifier(s) with varied compositions thereby forming different glass system materials. $Bi_2O_3$ acts as both glass-network former with [BiO_3] pyramidal units and as modifier with [BiO_6] octahedral units. As shown in Table 1, six exemplary dielectric sealing materials (A, B, C, D, E, and F) are composed of the 5-24 mol % MO, 20-46 mol % $B_2O_3$, 40-55 mol % Bi2O3, and 0-7 mol % Rare earth oxide (REO), as a specific example, the Cerium oxide (CeO) is used. In other embodiments, dielectric sealing materials are composed of the 0-35 mol % MO (MO=ZnO, BaO, $Fe_2O_3$, $TiO_2$ etc.), 0-40 mol % $B_2O_3$, 20-60 mol % $Bi_2O_3$, and 0-10 mol % Rare earth oxide (REO).

TABLE 1

Composition of six exemplary glass materials for making high strength moisture-resistant dielectric sealing materials

| Sample | MO (mol %) | $Bi_2O_3$ (mol %) | $Bi_2O_3$ (mol %) | REO (mol %) |
|---|---|---|---|---|
| A | 12 | 42 | 40 | 6 |
| B | 5 | 42 | 46 | 7 |
| C | 5 | 55 | 36 | 4 |
| D | 24 | 54 | 20 | 2 |
| E | 24 | 40 | 32 | 4 |
| F | 20 | 40 | 40 | 0 |

The triangulation diagram of FIG. 3 with primary $Bi_2O_3$, $B_2O_3$, ZnO or BaO, can be used to find approximate composition for the synthesized dielectric sealing material performance in both mechanical and dielectric properties. As a fact that the down selection of a moisture-resistant sealing material could be a binary glass system (for example, $Bi_2O_3$—ZnO), a ternary system (for example, $Bi_2O_3$—$B_2O_3$-MO, MO=ZnO, BaO, $Fe_2O_3$, $TiO_2$ etc.), and quaternary system (for example, $Bi_2O_3$—$B_2O_3$—ZnO-REO). The quaternary $B_2O_3$—$Bi_2O_3$-MO-REO based dielectric sealing materials have shown glass transition temperature from 400 to 480° C., but decreasing with the increasing of $Bi_2O_3$/$B_2O_3$ ratio, and increasing with the increasing of ZnO/$B_2O_3$ ratio and BaO/$B_2O_3$ ratio. The coefficient of thermal expansion could be from 7.0 to $12.0 \times 10^{-6}$ m/m·° C., with values increasing with increasing $Bi_2O_3$/$B_2O_3$, ZnO/$B_2O_3$ ratio or BaO/$B_2O_3$ ratio. The ambient effective insulation resistance is from $1 \times 10^{13}$ to $1 \times 10^{15}$ Ω, with its coefficient of insulation resistance ranges from $-(0.05 \pm 0.01)1/°$ C. from 100° C. to 400° C. Thus, the down selection of a glass system composition will greatly determine thermal, physical and mechanical properties of the dielectric sealing material.

Figure 4:
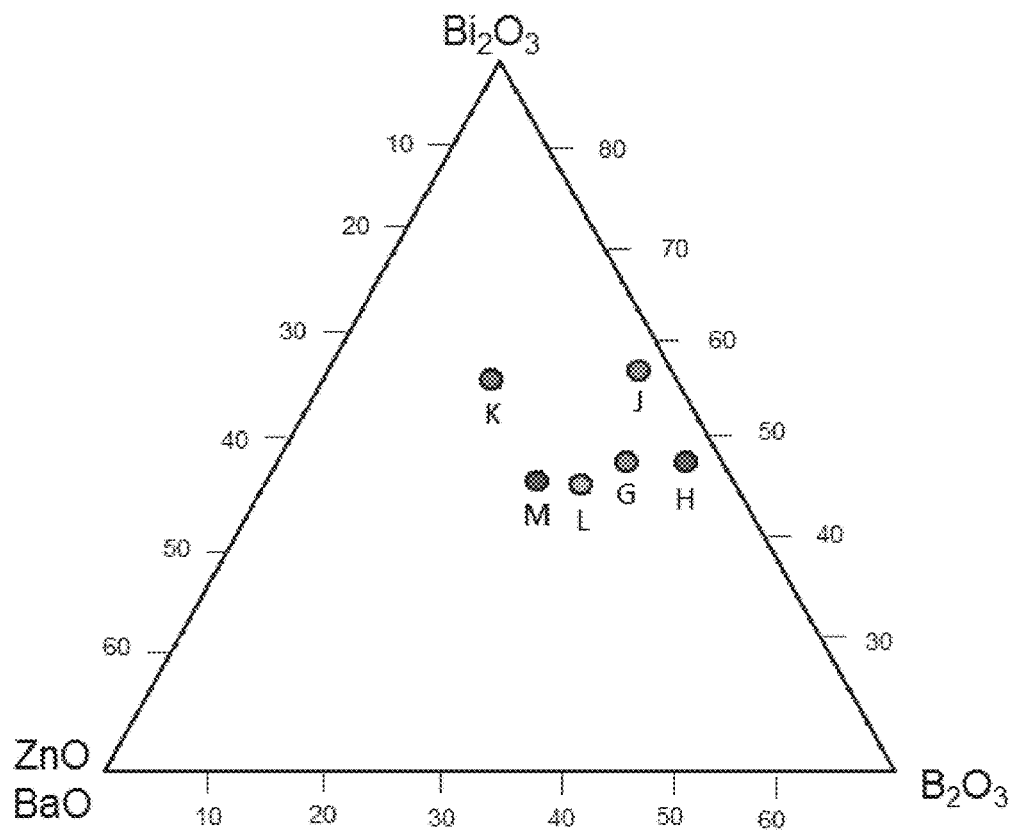
FIG. 4 illustrates another triangulation phase diagram for making further exemplary high moisture-resistant dielectric sealing materials according to various embodiments described herein.

FIG. 4 has provided a glass system composition triangulation phase diagram for obtaining further exemplary dielectric sealing materials having high electrical resistivity and hydrophobicity to be used to form a dielectric seal 21, 26. The glass system compositions may have water insoluble glass former(s) and network modifier(s) with varied compositions thereby forming different glass system materials. However, the rare earth oxide, such as cerium oxide, has relative high composition of 9-14%, twice that of the sealing materials in Table 1/FIG. 3. As shown in Table 2, a second set of six synthesized sealing materials (G, H, J, K, L, and M) are composed of the 4-21 mol % MO (ZnO or BaO), 15-35 mol % $B_2O_3$, 46-57 mol % $Bi_2O_3$, and 0-14 mol % Cerium oxides. In other embodiments, bismuth glass based dielectric sealing materials may be composed of the 0-25 mol % MO (MO=ZnO, BaO, $Fe_2O_3$, $TiO_2$ etc.), 0-40 mol % $B_2O_3$, 40-60 mol % $Bi_2O_3$, and 0-15 mol % Rare earth oxide (REO).

TABLE 2

Composition of six further exemplary glass materials for making high strength moisture-resistant dielectric sealing materials

| Sample | MO (mol %) | $Bi_2O_3$ (mol %) | $Bi_2O_3$ (mol %) | REO (mol %) |
|---|---|---|---|---|
| G | 11 | 47 | 31 | 11 |
| H | 4 | 47 | 35 | 14 |
| J | 4 | 57 | 28 | 11 |
| K | 20 | 56 | 15 | 9 |
| L | 17 | 46 | 28 | 9 |
| M | 20 | 45 | 35 | 0 |

These quaternary $B_2O_3$—$Bi_2O_3$-MO-REO based dielectric sealing materials may be prepared by conventional melt-quench technique using reagent grade chemicals $Bi_2O_3$, B(OH)$_3$, ZnO, or BaO, and CeO. Initial raw material powders may be weighed to the appropriate amounts, mixed together in a container, then, transferred to a platinum crucible. The platinum crucible may be heated in an electrically heated furnace, or other heating method, to a temperature of about 850° C. depending on the composition. The crucible may be placed in furnace and allows the melting for the desired time in which the glass could be melt properly without any un-melted element left behind. After allowing sufficient melting temperature, melting time and intermittent stirring to the melt, the melt may then be caste on a container filled with ambient temperature de-ionized water. The obtained glass frits may be ground to have a particle size preferably of 2-10 μm for making hollow cylinder shaped beads, following a high compression process optionally using a burn-off polymer binder. This embodiment and other embodiments described herein are not limited by the above sealing material making method. In fact the sealing glasses may be made from bismuth oxide that is a component of the glass, bismuth, bismuth carbonate, bismuth nitrate, bismuth hydroxide, bismuth ammoniate, bismuth hydride, or any other similar bismuth compound, either singularly, or in any combination, used as precursors to create the resultant desired glass composition, following a similar preparation process described as above.

To obtain appropriate mechanical and thermal properties from a synthesized sealing material the mass density of such a quaternary glass system depends upon ratio of each composition over glass system. The effective density can be approximately written by:

$$\rho = \Sigma_{n=1}^{k} a_n \cdot \rho_n \text{ and } \Sigma_{n=1}^{k} a_n = 1 \quad (1)$$

where $a_n$ and $\rho_n$ are fraction and mass density of each glass composition, and k represents the number of compositions in the synthesized glass system. If starting from an initial density, $\rho_0$, of the simple glass system, such as only $Bi_2O_3$, the incorporation of different glass compositions, such as $B_2O_3$, ZnO, BaO, and CeO, the density variation in the dielectric sealing material could lead to a corresponding variation in the effective coefficient of thermal expansion (CTE) by $$CTE = \frac{\Delta V}{(T_g - T)V_o} = -\frac{\rho - \rho_o}{(T_g - T_o)\rho} \quad (2)$$

where the CTE is determined by the sealing material volume or density change, $T_g$ is glass transition temperature. It is clear that the incorporation of low density glass compositions will increase CTE of the synthesized glass system. For example, the initial density of $Bi_2O_3$, $B_2O_3$, and ZnO in the ternary glass system of $B_2O_3$—$Bi_2O_3$—ZnO is 8.90, 2.55, and 5.61 g/cm$^3$, respectively. The effective mass density will depend upon either mol percentage or weight percentage of each chemical component. The increase of the $B_2O_3$ composition could effectively reduce effective mass density, but inversely increase CTE.

Conventional ceramic materials may have either crystalline (including semi-crystalline and polycrystalline, nanocrystalline, and microcrystalline) structure or an amorphous structure. Crystalline materials may have different phases at different temperature and/or pressure conditions, and may exhibit reversible phase transitions at different temperatures and pressures. An amorphous material may have no phase transition but instead a series of morphology variation, namely, a variation from one morphology to another, where sometimes this variation is irreversible (for example, a relatively looser material microstructural morphology may be able to transition to a more condensed morphology, but this transition may not be reversible). Normally, a ceramic material may have mixed phases or polymorphs that modulate mechanical and dielectric strengths of the dielectric sealing material. For fabricating such a bismuth oxide contained dielectric sealing material, both the firing temperature and isothermal heating time are critical for obtaining a stable material microstructure or crystalline phase with preferred dielectric and mechanical strengths.

Figure 5A:
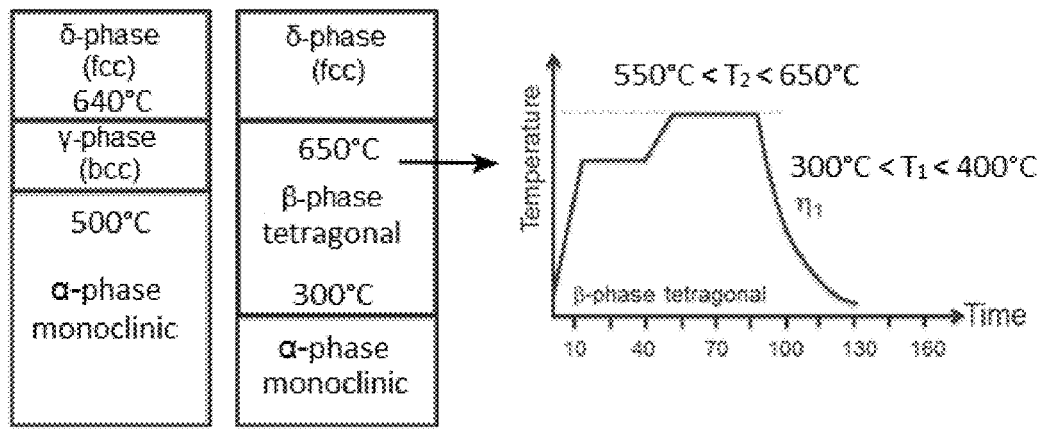
FIG. 5A shows an example glass-to-metal sealing body fabrication process by referencing polymorphs of $Bi_2O_3$ dominated glass-ceramic material according to various embodiments described herein.
Figure 5B:
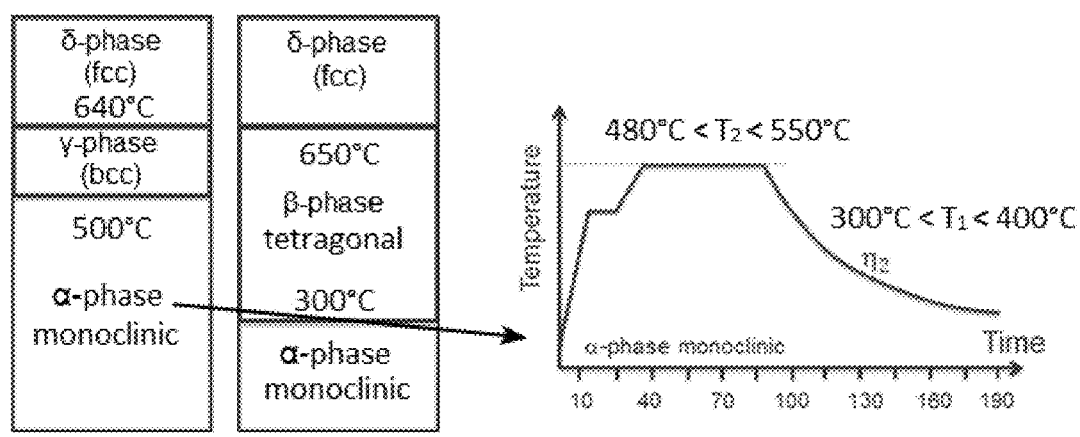
FIG. 5B shows another example glass-to-metal sealing body fabrication process by referencing polymorphs of $Bi_2O_3$ dominated glass-ceramic material according to various embodiments described herein.

To better understand sealing material microstructures and phases it will be helpful by understanding $Bi_2O_3$ glass material first because of its multi-phase characters or five polymorphic forms for pressure less than 50,000 PSI. Two stable polymorphs, namely monoclinic $\alpha$ phase and face-centered cubic $\delta$ phase. There are three metastable phases, namely, tetrahedral $\beta$ phase, body-centered-cubic $\gamma$ phase and triclinic co phase. FIGS. 5A and 5B illustrate quaternary $B_2O_3$—$Bi_2O_3$-MO-REO based dielectric sealing materials that may also have similar several polymorphs as $Bi_2O_3$ glass. For example, at ambient $Bi_2O_3$ glass has a monoclinic crystal $\alpha$-phase structure. While at temperature of 500-650 degrees Celsius $Bi_2O_3$ has a structure related to $Bi_{12}SiO_{20}$ bcc $\gamma$-phase structures. At temperature of 650-730 degrees Celsuis fcc $\delta$-phase $Bi_2O_3$ is principally an ionic conductor with a defective fluorite-type crystal structure. The sealing material has to be one of stable polymorphs, either the monoclinic $\alpha$ phase or $\delta$ phases. During glass firing process the initial sintered glass frits will be fired at a certain temperature that the glass structure may transforms to the cubic $\delta$-$Bi_2O_3$ if it is heated above 730 degrees Celsius, until melting at 820-860 degrees Celsius. The microstructure of $Bi_2O_3$ during cooling process will be transformed from the $\delta$-phase to tetragonal $\beta$-phase or $\gamma$-phase, then to $\alpha$-phase or with multi-phase microstructures, depending upon the cooling process. On the other hand, on cooling $\delta$-$Bi_2O_3$ process it is possible to form two intermediate metastable phases at ambient conditions: the tetragonal $\beta$ phase (SG P-421c, No. 114), also known as sphaerobismoite, at ~650 degrees Celsius, and the body-centered cubic $\gamma$ phase (SG I23, No. 197) at ~640 degrees Celsius The $\gamma$-phase can exist at room temperature with very slow cooling rates, but $\alpha$-phase $Bi_2O_3$ always forms on cooling the $\beta$-phase. The $\alpha$-phase exhibits p-type electronic conductivity at room temperature which transforms to n-type conductivity (charge is carried by electrons) between 550 degrees Celsius and 650 degrees Celsius, depending on the oxygen partial pressure. The conductivity in the $\beta$, $\gamma$ and $\delta$-phase is predominantly ionic with oxide ions being the main charge carrier. The conductivity (resistivity) of $\delta$-$Bi_2O_3$ is about three orders of magnitude greater (lower) than monoclinic $\alpha$ phase. For obtaining a desirable sealing material with high dielectric strength, it is critical to control crystalline phase by firing temperature and heating duration, as well as the cooling process.

By referencing the phase diagram in the $Bi_2O_3$ glass as shown in FIGS. 5A and 5B, a firing processes for making stable dielectric sealing materials having high electrical resistivity and hydrophobicity is depicted. FIG. 5A illustrates a graphical representation of how a binary, ternary or a quaternary dielectric sealing material system may be fired at relative high temperature. In some embodiments, a fabricating process may begin with heating up the metal shell 11 having conducting pin(s) 13 and sealing material disposed within the conduit 12 at a first temperature ($T_1$) between 300 degrees Celsius and 400 degrees Celsius for a first time period ($\tau_1$) or duration of 10 to 30 minutes. Next, the furnace temperature may be increased from $T_1$ to second temperature ($T_2$) between 550 degrees Celsius and 650 degrees Celsius and maintained at $T_2$ for a second time period ($\tau_2$) or duration of 30 to 45 minutes. Next, the whole assembly may be cooled down to ambient. A fast quenching process could make amorphous glass dominated multi-phase dielectric sealing material. However, a cooling process with slow rate may form $\alpha$-phase dominated multi-phase sealing material with a small portion of the $\delta$-phase microstructures.

FIG. 5B depicts a graphical representation of another fabrication process for making quaternary $B_2O_3$—$Bi_2O_3$-MO-REO based a-phase dominated dielectric sealing material. In some embodiments, the process may comprise firing the initial glass-to-metal seal assembly at a medium temperature whenever the rare earth oxide has relative lower composition for making stable glass network. In some embodiments, a fabricating process may begin with heating up the metal shell 11 having conducting pin(s) 13 and sealing material disposed within the conduit 12 at a first temperature ($T_1$) between 300 degrees Celsius and 400 degrees Celsius for a first time period ($\tau_1$) or duration of 10 to 30 minutes. Next, the furnace temperature may be increased from $T_1$ to second temperature ($T_2$) between 480 degrees Celsius and 550 degrees Celsius and maintained at $T_2$ for a second time period ($\tau_2$) or duration of 30 to 45 minutes. Next, the whole assembly may be cooled down to ambient also by either quenching process or slow cooling process. A fast quenching process could also make glass-ceramic dielectric sealing material, which may be composed of amorphous glass network and monoclinic α-phase grinds. However, a slow cooling process may be possible to make monoclinic α-phase dominated sealing material.

As mentioned, an aspect of the quenching process can be described by thermal tempering process that is the use of a quenching fluid (such as water, hydrocarbon or mineral oil, or gas/liquid air and nitrogen) having an appropriate thermal conductivity, density, viscosity and specific heat capacity. To efficiently dissipate the heat generated by the quenching process to create a desirable material microstructure the baseline temperature and thermal conductivity of the quenching medium should be considered. A low-temperature baseline enables a relatively high cooling rate, such as might be achieved by quenching using a liquid nitrogen medium. A high-temperature quenching fluid could slow down the cooling rate, such as quenching a metal in a hot fluid (boiling water, hot oil), but the microstructure, Q, of the sealing material having the preferred crystalline phase or material properties will depend upon both the cooling rate and the thermal conductivity difference between the quenching fluid and the sealing glass, as described by:

$$Q \propto \eta (Tg-T)/(k-kg), \quad (3)$$

where k is thermal conductivity of the quenching fluid, and $k_g$ (~1.0 W/m/K) is the thermal conductivity of the sealing material, and η is cooling rate. From thermal conductivity of the quenching fluid, such as Air, $N_2$ or $O_2$, the quenching rate, η, will be critical factor in controlling the phase or microstructure of the sealing material.

Figure 6:
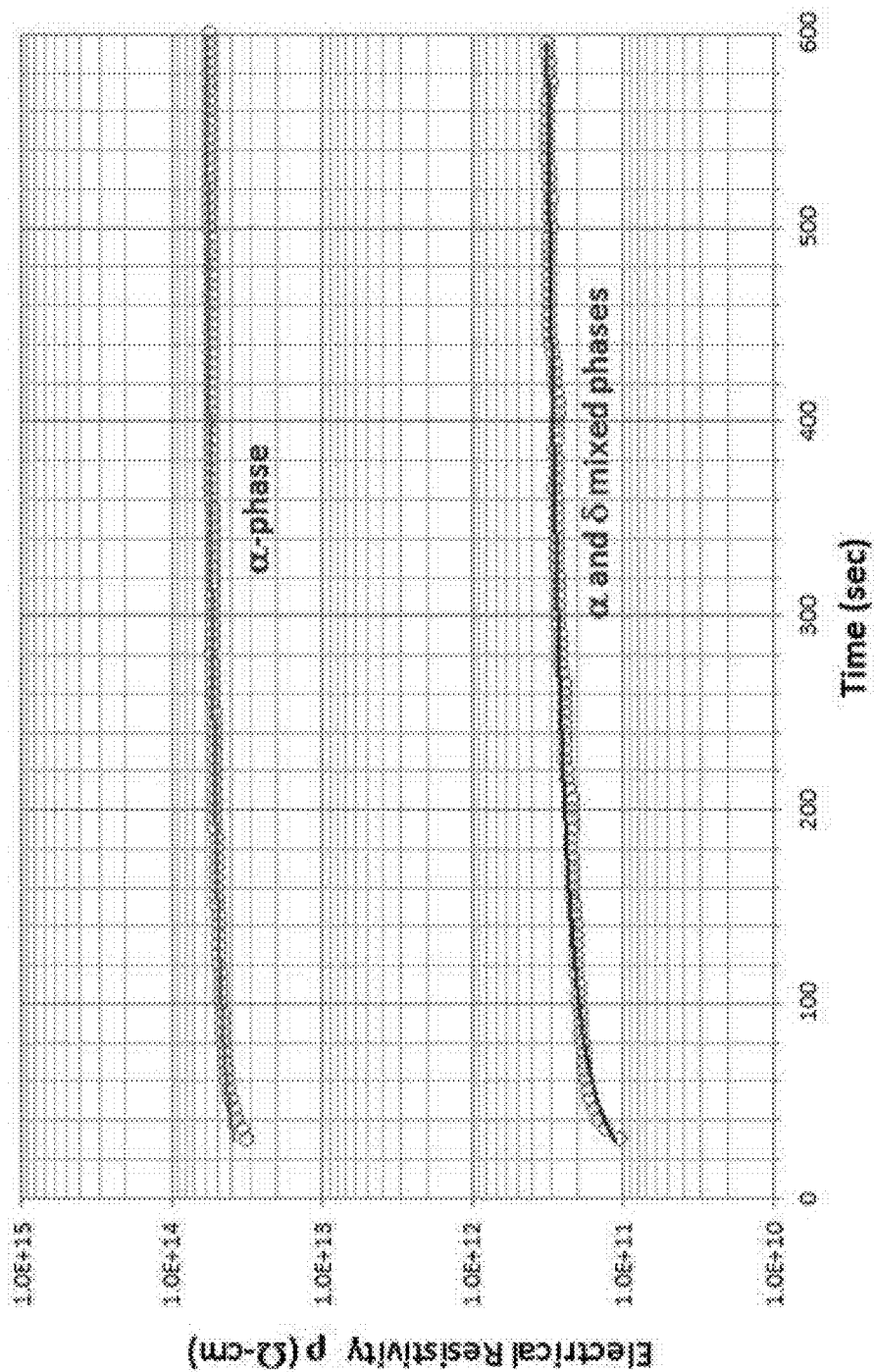
FIG. 6 shows the measured electrical resistivities of two exemplary ternary $Bi_2O_3$—$B_2O_3$—ZnO sealing materials with 570 degrees Celsius and 530 degrees Celsius firing temperatures

In some embodiments, the method to obtain a-phase dominated sealing material is by a combined firing temperature and cooling process control. FIG. 6 has shown an exemplary data from a ternary $B_2O_3$—$Bi_2O_3$—ZnO based dielectric sealing material, which is measured from two different firing temperatures but following a slow cooling process. The insulation resistance of α-phase like sealing material may be around $0.60 \times 10^{14}$ Ω·cm, but that of the α and δ mixed phase like sealing material is only about $2.5 \times 10^{11}$ Ω·cm, which is close to about 2-3 orders low in amplitude than a-phase like sealing material.

Figure 7:
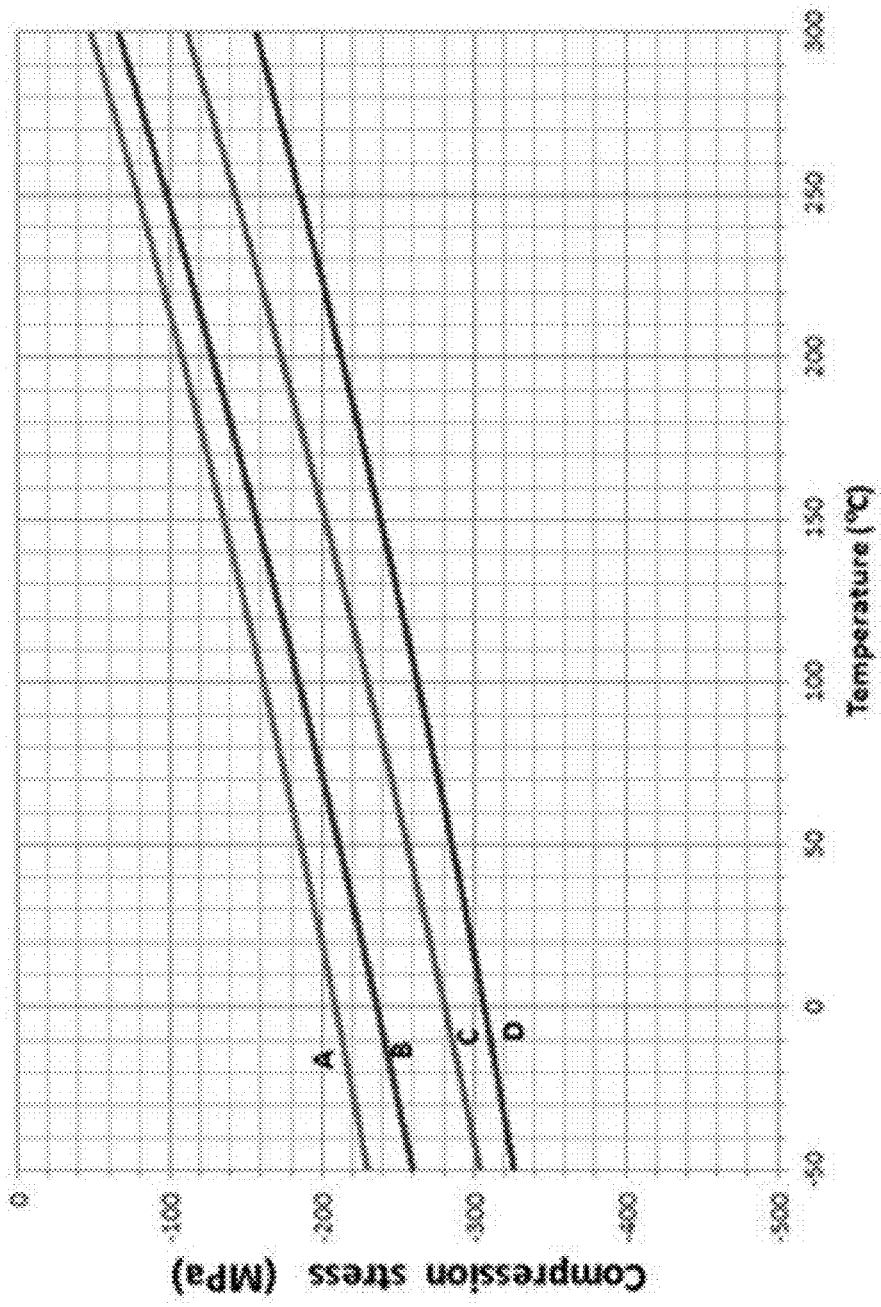
FIG. 7 depicts a graphical representation of the mechanical compression from four exemplary dielectric sealing material sealed downhole electrical feedthroughs according to various embodiments described herein.
Figure 8:
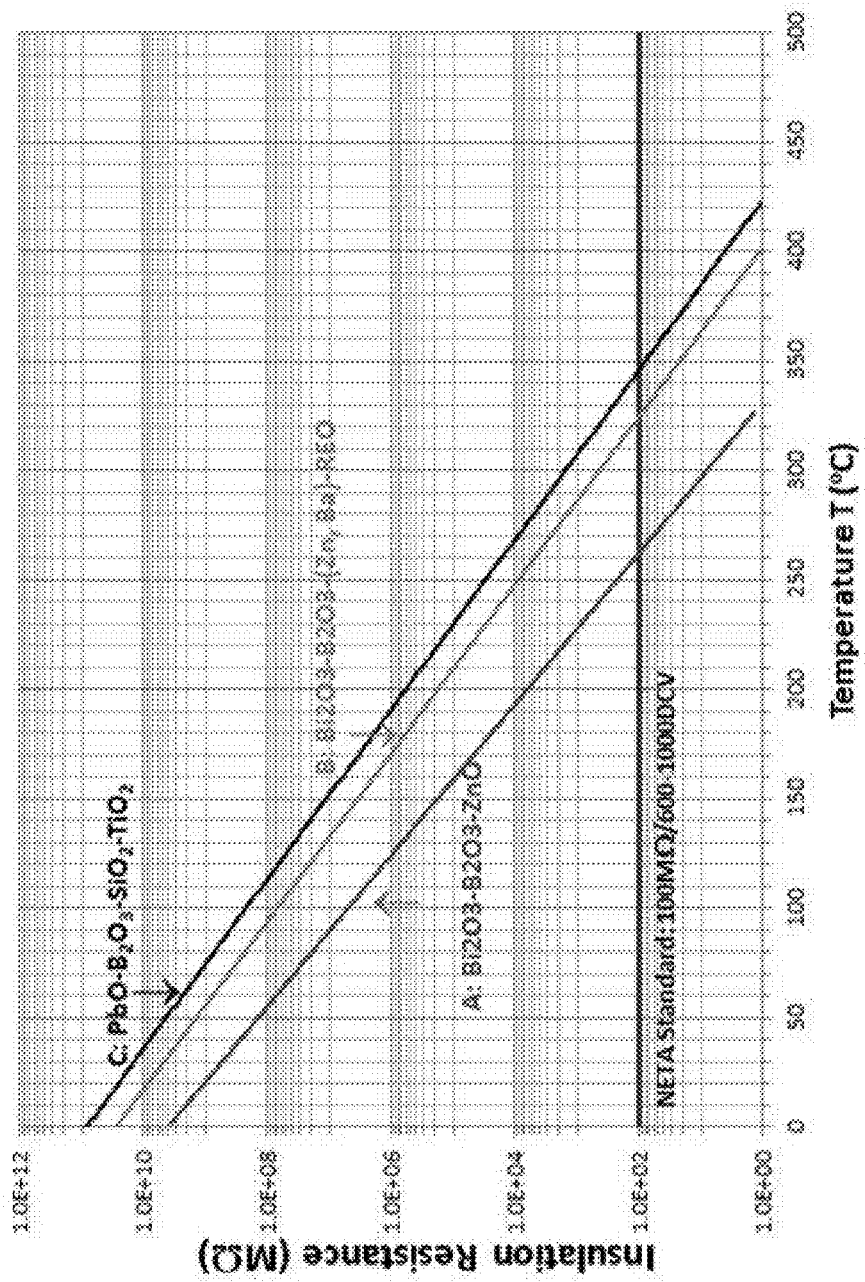
FIG. 8 illustrates a graphical representation of the temperature-dependent insulation resistances from three exemplary dielectric sealing material sealed downhole electrical feedthroughs according to various embodiments described herein.

To demonstrate if these fabricated sealing materials have appropriate mechanical and dielectric strengths several electrical feedthrough prototypes have been made based on Inconel 718 metal shell 11 and Inconel X750 conducting pin 13. In preferred embodiments, an electrical feedthrough 100 may use CTE mismatched compression method to integrate dielectric sealing material with Inconel metal shell 11 and conducting pin(s) 13 together as a hermetically sealed feedthrough 100 for mechanical and electrical quantification tests. The typical outer diameter of a metal shell 11 may be approximately 4.06 mm with the shell conduit 12 having a diameter of approximately 1.98 mm with an overall length of 6.66 mm although the feedthrough 100 may be configured with any other dimensions. Four glass systems have been used to make these prototypes, where A is $Bi_2O_3$—$B_2O_3$—Zn, B is $Bi_2O_3$—$B_2O_3$-MO-REO, C is PbO—$B_2O_3$—$SiO_2$—$TiO_2$, and D from a ternary $B_2O_3$—$SiO_2$—SrO glass system. FIG. 7 has illustrated the internal compression stress on the metal shell 11 as a function of the downhole temperature. Obviously, this thermo-mechanical stress has high amplitude at low temperature and the elevated temperature actually releases compression. By comparing high compression strength (~400 MPa to ~500 MPa) of these sealing materials, the ratio of this stress amplitude over compression strength is about 2 to 3 for possible operation range from −40 degrees Celsius to 300 degrees Celsius. Despite the hydraulic pressure also adding about 10% compression stress onto the metal shell 11 outer surface 17, the 2-3 ratios are acceptable mechanical strength for downhole deployment. However, the true maximum operation temperature actually also depends upon electrical insulation. FIG. 8 has given the measured temperature-dependent insulation resistance, or temperature-dependent hot IR, from exemplary A, B, and C sealing glass material sealed electrical feedthrough 100 prototypes.

Figure 9:
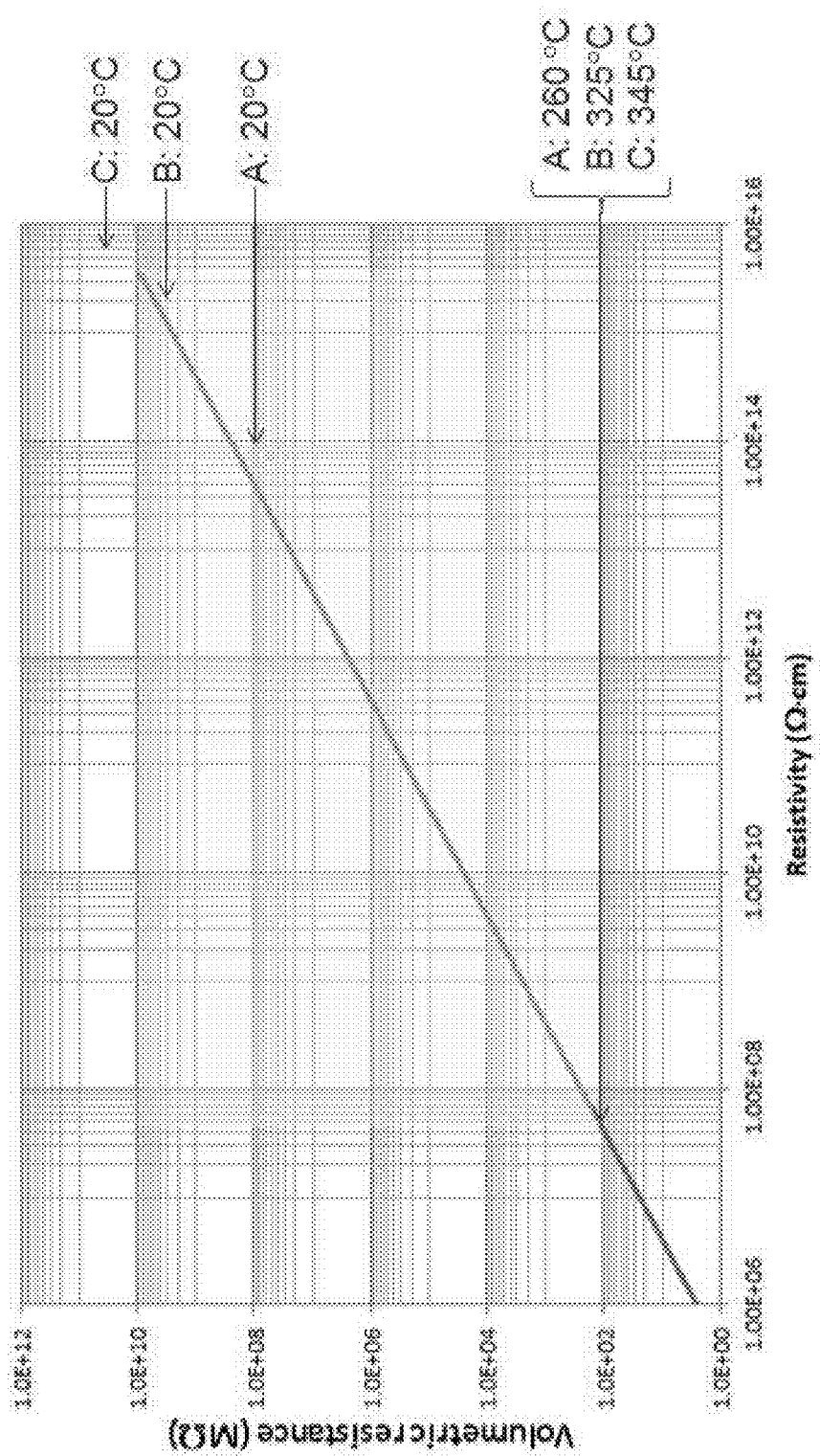
FIG. 9 shows a graphical representation of the volumetric resistivity and maximum operating temperatures from resistances from three exemplary dielectric sealing material sealed downhole electrical feedthroughs according to various embodiments described herein.

As a fact that moisture could be evaporated whenever the temperature is higher than 85 degrees Celsius and the obtained insulation resistance is defined as volumetric resistance, $R_v$, which is described by $$R_v = \frac{\rho\left(\frac{\phi g}{\phi p}-1\right)}{2\pi L}, \quad (4)$$

where ρ is resistivity in Ω-cm, L is sealing length, $\phi_g$ and $\phi_p$ is outer and inner diameter of the sealing glass hollow cylinder, respectively. Obviously, the higher the resistivity is, the higher the insulation resistance is for a dielectric sealing material. The ambient resistivity determined from the measured insulation resistances, as shown in FIG. 9, is about $1.0 \times 10^{13}$ Ω·cm for sealing material A, $4.0 \times 10^{14}$ Ω·cm for sealing material B, and $4.0 \times 10^{15}$ Ω·cm for sealing material C, respectively. However, these three exemplary sealing material sealed electrical feedthroughs 100 have 100 MΩ insulation resistance at 260 degrees Celsius for sealing material A, 325 degrees Celsius for sealing material B, and 345 degrees Celsius for sealing material C, respectively. By comparing the mechanical stress amplitude, as shown in FIG. 7, an electrical feedthrough 100 sealed with material A, B and C may work up to 260 degrees Celsius, 300 degrees Celsius, and 320 degrees Celsius respectively. This combined mechanical and dielectric strength could enable such electrical feedthroughs 100 to be operable at least in Oil-based wellbores with 30,000 PSI/177 degrees Celsius downhole condition.

Figure 10:
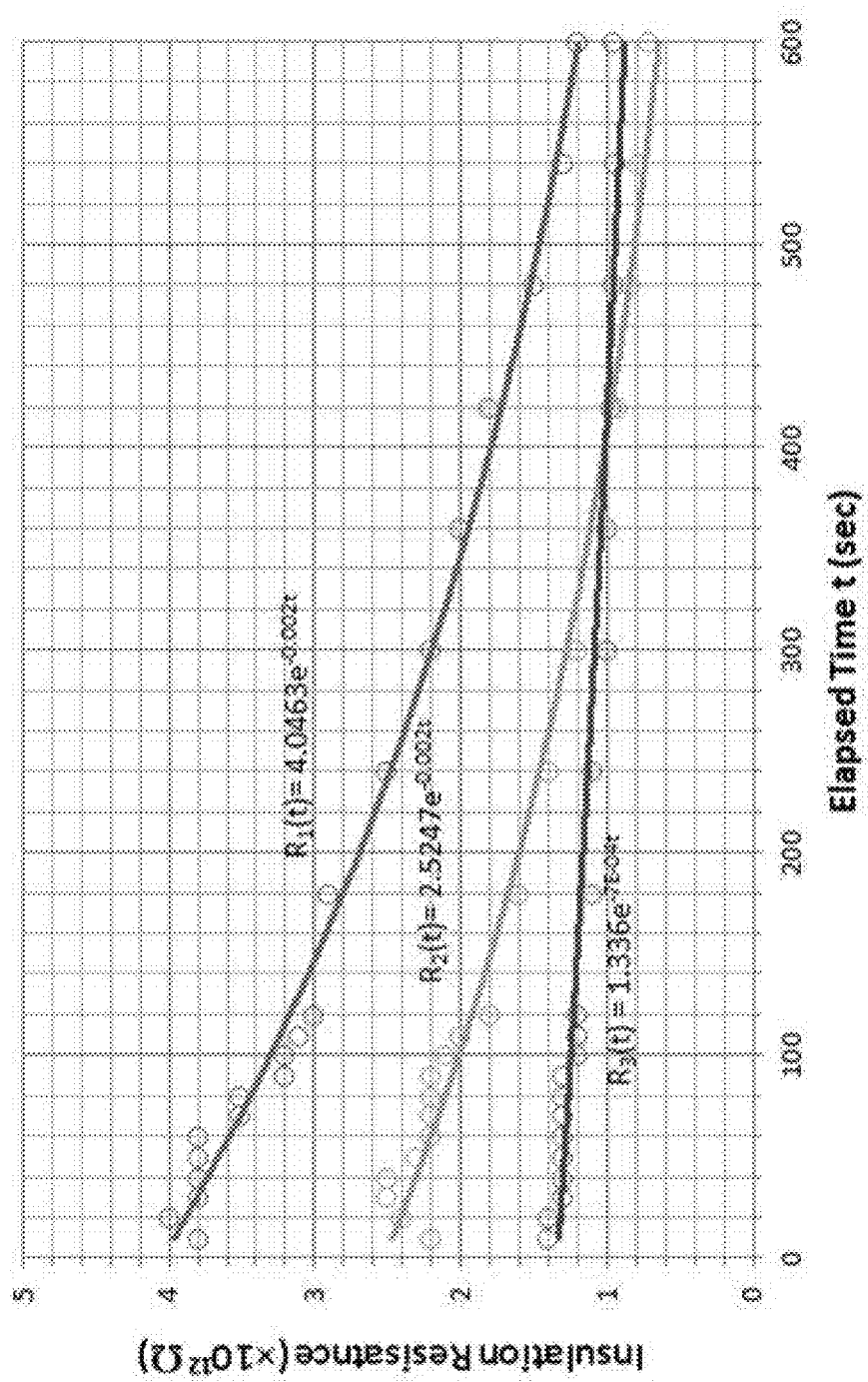
FIG. 10 depicts a graph showing typical effective insulation resistance measurements from three example moisture-sensitive dielectric sealing material sealed based electrical feedthrough packages subsequent to soaking in 100 degrees Celsius water for 1-2 hours duration.
Figure 11:
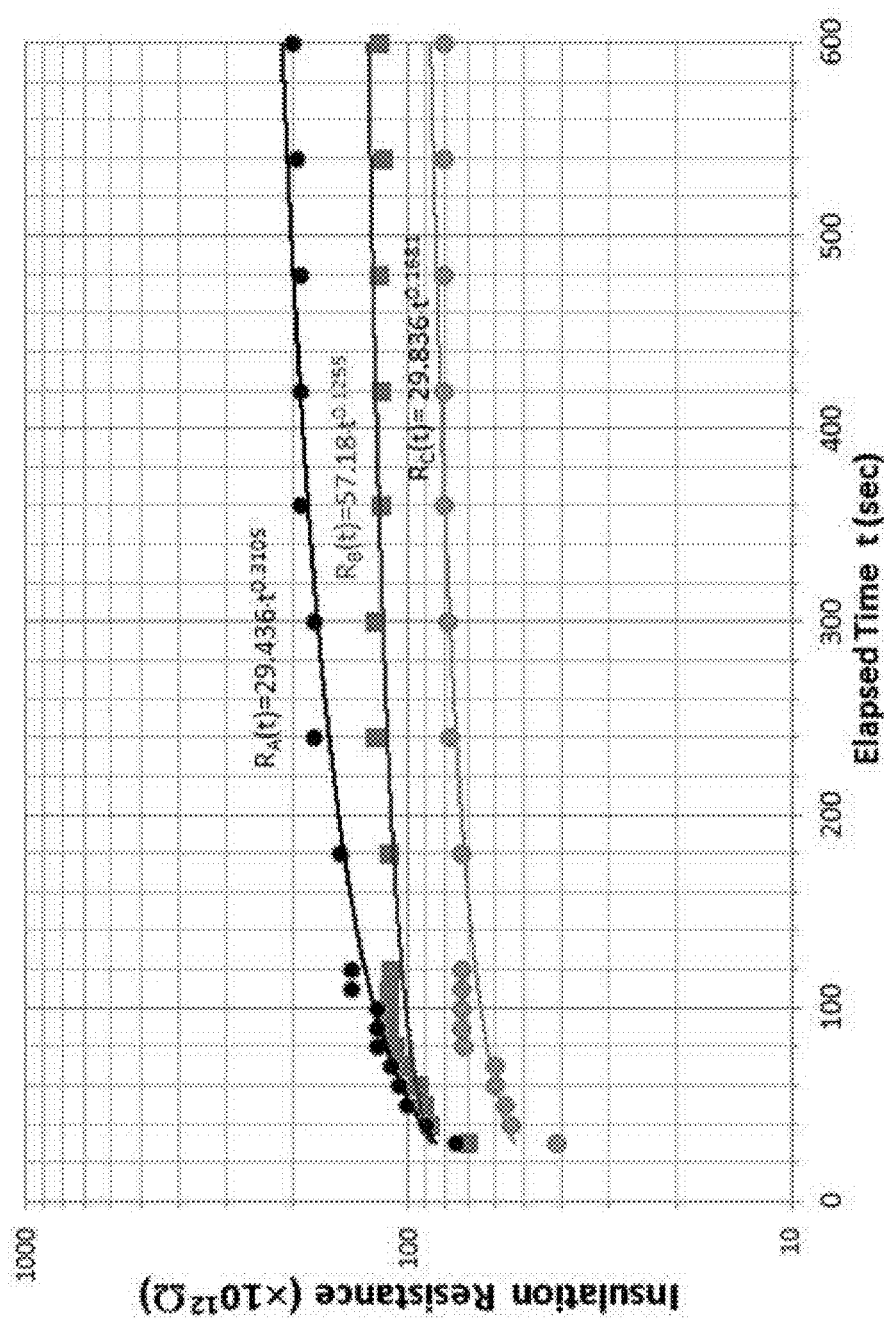
FIG. 11 illustrates a graph showing measured effective insulation resistance values from three example moisture-resistant dielectric sealing material sealed electrical feedthrough packages subsequent to soaking in 100 degrees Celsius water for 1-2 hours duration.
Figure 12:
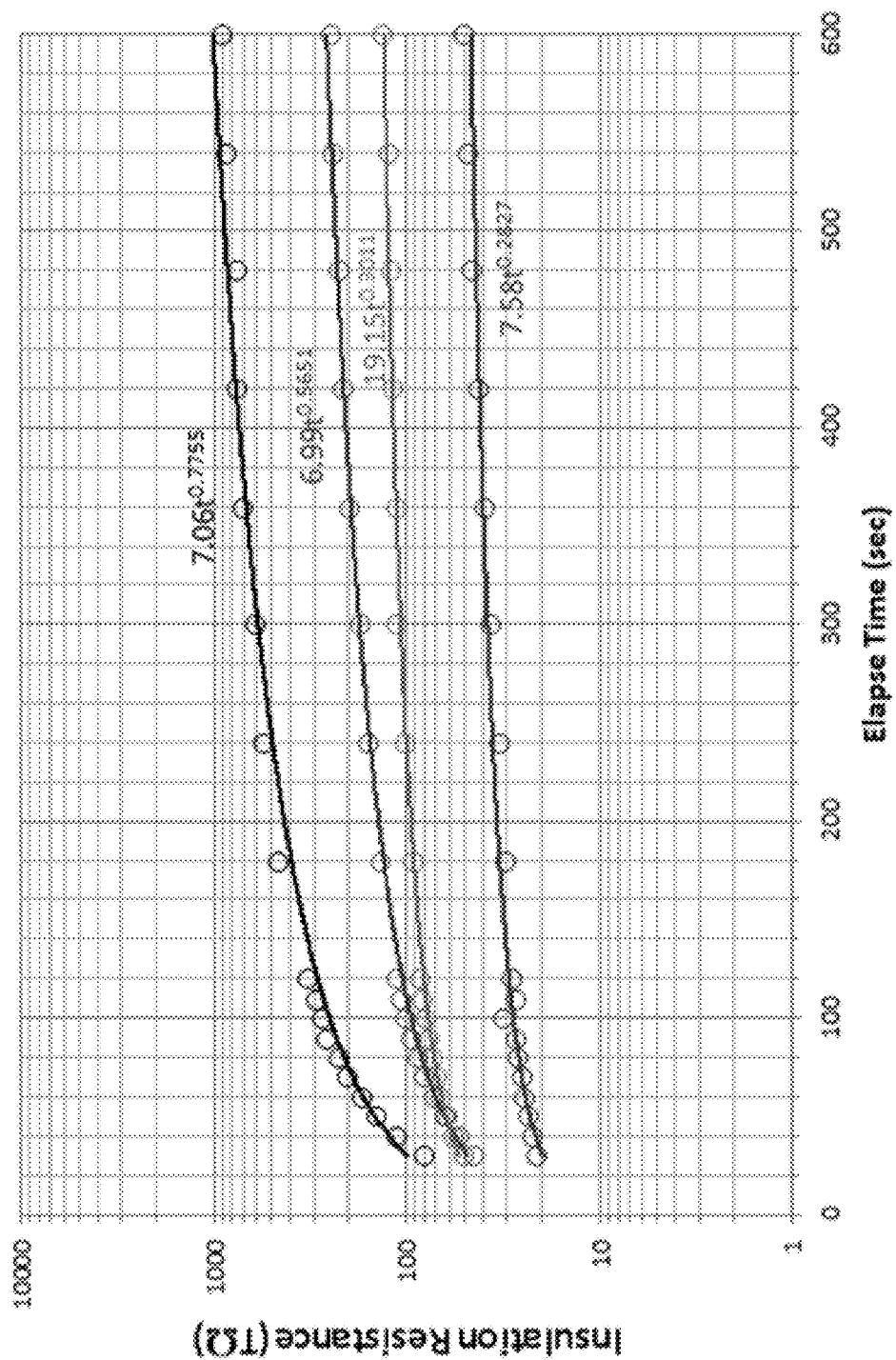
FIG. 12 depicts a graph showing measured insulation resistances from four exemplary sealing material based feedthrough prototypes, after 24 hours at 30,000 PSI water-based hydraulic pressurized soaking process.

Turning now to FIGS. 10-12, the dielectric strength of a sealing material can be measured and to quantify if the sealing material satisfies anti-moisture needs. A method for verifying if a dielectric sealing material has moisture resistance may include (i) installing a dielectric sealing material sealed feedthrough 100 in a water-based hydraulic pressurized chamber, (ii) measuring ambient insulation resistance at ambient as reference value, (iii) measuring effective insulation resistance under water-batch soaking process, (iv) measuring effective insulation resistance under 1-2 hour 100 degrees Celsius water-batch soaking process, and (v) measuring effective insulation resistance under elevated temperature and water-based hydraulic pressurized soaking process. The effective insulation resistance may be readout based on insulation resistance as a function of the 0-600 second elapsed times. This method is fairly independent of temperature and often can give some conclusive information on moisture effect on sealing material dielectric properties.

Tests by this method are sometimes referred to as polarization index and dielectric absorption tests.

FIGS. 10 and 11 show two typical effective insulation resistance measurements from a ternary $B_2O_3$—$SiO_2$—$SrO$ glass system (material D in FIG. 7) in FIG. 10 and a quaternary $B_2O_3$—$Bi_2O_3$-MO-REO glass system in FIG. 11, subsequent to soaking in 100 degrees Celsius water for 1-2 hours duration. Initial dry ambient insulation resistance from each sample has first been measured at 500 DCV with the value from 10 T$\Omega$ to a few hundred T$\Omega$ (or 1 T$\Omega$=$1\times10^{12}\Omega$). As shown in FIG. 10 that the measured effective insulation resistance values from three exemplary feedthrough prototypes have shown a negative exponential function of time. Such a time-decayed IR values strongly indicates unacceptable insulation strength, especially, the measured dielectric absorption ratio, IR (60)/IR (30) is less than 1.0, implying the sealing material has unacceptable insulation strength, potentially due to moisture hydroxyl ion induced surface conductivity at inner surface 18. FIG. 11 provides the measured effective insulation resistance values from three exemplary $B_2O_3$—$Bi_2O_3$-MO-REO glass system sealed feedthroughs 100 as a function of time. The data have been fairly fitted to R(t)=$R_o t^v$ (v=0.1 to 0.3). In addition, the measured dielectric absorption ratio, IR(60)/IR(30) is (1.40±0.05), implying the sealing material has acceptable insulation strength or has desirable moisture-resistant properties. This power function of the time is consistent with the capacitance charge response characters, where the $\tau_0$=RC≈ $(3-5)\times10^{-12}*1\times10^{14}$≈300-500 sec.

Since the 100 degrees Celsius water soaking process is under atmospheric pressure, it is more likely that the surface of the dielectric sealing material has become conductive due to OH$^-$ hydroxyl ion by dipole interaction with poled material surface. If assuming a surface layer has a thickness of $h_s$ and surface resistance of $R_s$, the effective insulation resistance could be approximately written as $$R = \frac{R_v \cdot R_s}{f_1 R_v + f_2 R_s}, \quad (5)$$

where $R_v$ is volumetric resistance. $f_1$ ($f_2$) is fraction of the surface layer (sealing material) thickness over total sealing length, and $f_1+f_2=1$. It is clear that R could be equal to $R_v$ if $R_s\sim\infty$. On the other case, R$\ll R_v$ if $R_s\to 0$, for a highly hydrophilic sealing material. However, if this thin layer of the moisture-rich surface has surface resistance $R_s$ neither infinity nor zero, the effective insulation resistance will degrade as a function of time, as seen in FIG. 10.

To further verify the moisture-resistance from the dielectric sealing material, the electrical feedthrough 100 prototypes have experienced hydraulic pressurized soaking process up to 30,000 PSI that simulates downhole or subsea pressure condition. FIG. 12 provides the measured insulation resistances from exemplary $Bi_2O_3$—$B_2O_3$-MO-REO sealing material based feedthrough 100 prototypes, after 24 hours 30,000 PSI water-based hydraulic pressurized soaking process. First, all four sealing materials have also shown positive response as a power function of time, namely, R (t)=$R_o t^v$ (v is constant). By comparing with ambient insulation resistance values of 50-900 T$\Omega$, the time dependent insulation resistances at least indicate the water or moisture seems to not be affecting insulation performance after such high hydraulic pressure water soaking process. Of course, the measurement also found that a layer of white-colored fouling condensed onto the glass surface may induce increase in surface conductivity, which can be expected by Eq.(5). Thus, the measured insulation resistance may vary from prototype to prototype because a layer of conductive scaling or fouling that is condensed onto the sealing material surface that might induce insulation deterioration. Once again, a polymer material based isolator 31, 36, may be used as a mechanical barrier to prevent similar fluid that may contain conductive ions, or salt ions from contacting the dielectric sealing material surfaces of the dielectric seal(s) 21, 26, that provide better reliability for downhole deployment.

It should be very clear that a moisture-resistant sealing material may not chemically interact with extrinsic hydroxyl ions or absorb water, but electrical breakdown still may occur because the high hydraulic pressure may force conductive downhole fluid condensed onto the sealing material surface when there exists a differential pressure from opposite sides of a feedthrough 100. The effective insulation resistance can be significantly reduced by such a conductive surface layer formation. Hydrophobic properties of a dielectric sealing material may also mitigate water bead up that an electrical feedthrough may be still normally function even under the deteriorated insulation. In one case, the effective insulation resistance becomes stable after a certain time by a balance the moisture inner and outer diffusion from the sealing material surface. In the other case, the water beading up effect at the hydrophobic sealing material surface could suppress further insulation degradation.

Figure 13:
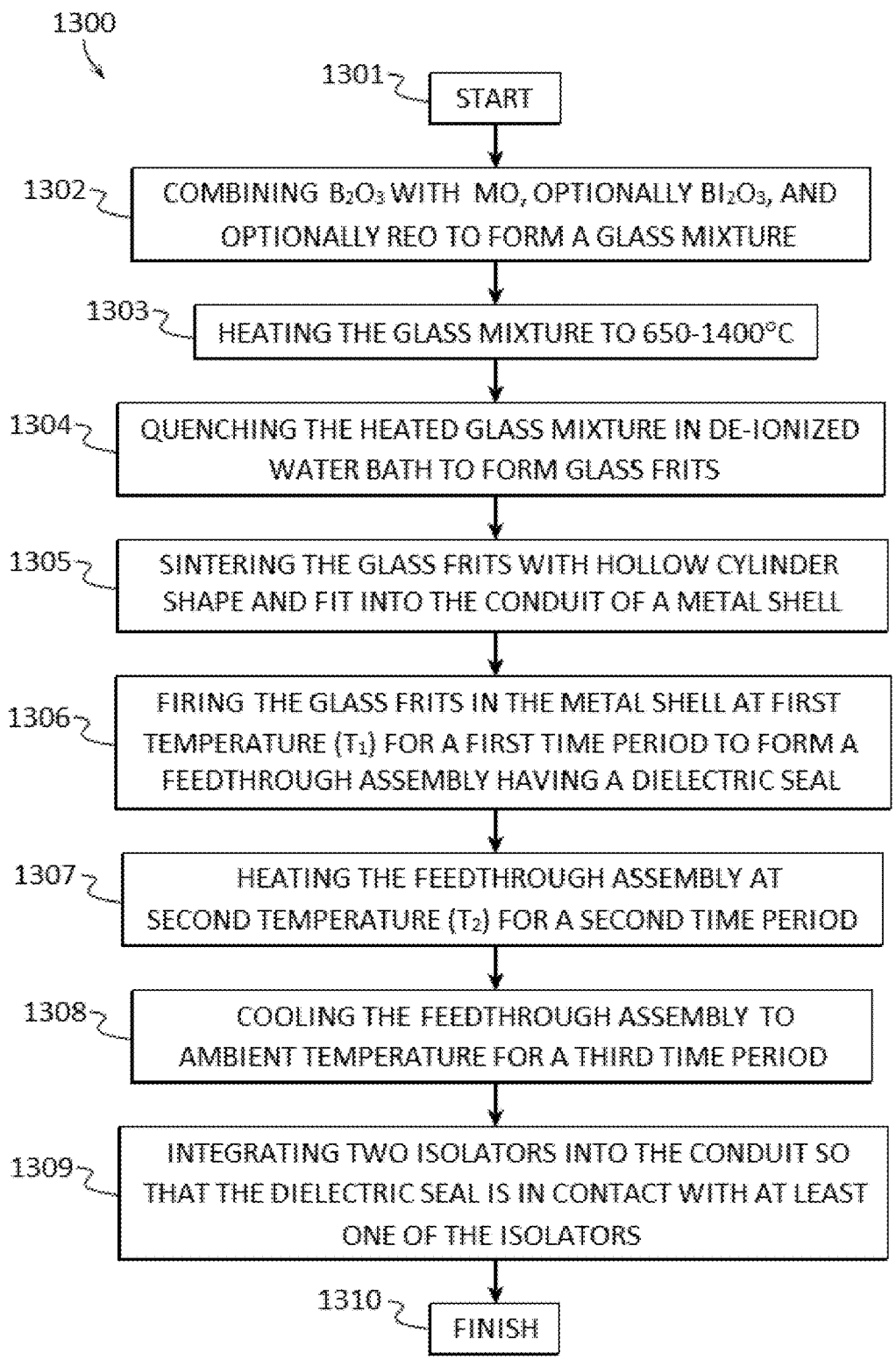
FIG. 13 shows a block diagram of an example method of forming a downhole electrical feedthrough package according to various embodiments described herein.

FIG. 13 shows a block diagram of an example method of forming a downhole electrical feedthrough package ("the method") 1300 according to various embodiments described herein. The method 1300 may be used to make a feedthrough package 100 comprising a binary glass system $B_2O_3$-MO, a ternary $B_2O_3$—$Bi_2O_3$-MO glass system, or a quaternary $B_2O_3$—$Bi_2O_3$-MO-REO glass system with MO=ZnO, BaO, $TiO_2$, $Fe_2O_3$ and REO=lanthanum series based rare earth oxide oxides (REO) in which the REO enhanced the moisture resistance by increased hydrophobicity of the glass system. The use of REO in the glass system enhances the moisture resistance of the glass system based on the REO in inhibiting hydrogen bonding with interfacial water molecules resulting in a hydrophobic hydration structure.

In some embodiments, the method 1300 may start 1301 and $Bi_2O_3$, $B_2O_3$ and MO may be combined to form a glass mixture in step 1302. In further embodiments, $Bi_2O_3$, $B_2O_3$, and MO may be combined to form a glass mixture in step 1302. In still further embodiments, $Bi_2O_3$, $B_2O_3$, MO, and REO may be combined to form a glass mixture in step 1302. MO may be or comprise ZnO, BaO, $TiO_2$, and $Fe_2O_3$ or their glass making pre-cursors. REO may be or comprise $CeO_2$, $Y_2O_3$, $Sc_2O_3$, $Nd_2O_3$, $Pr_2O_3$, and lanthanum series oxides. Preferably, the glass mixture components may be selected by down selecting (as shown in the examples of FIGS. 4 and 5 and Tables 1 and 2) water insoluble glass former(s) and network modifier(s) and controlling each chemical composition by 20 mol %<$Bi_2O_3$<60 mol %, 0 mol %<$B_2O_3$<40 mol %, 0 mol %≤(MO)<35 mol %, and 0≤REO<15 mol %.

Next in step 1303, the glass mixture may be heated to approximately 650-1400 degrees Celsius. In some embodiments, the glass mixture may be placed in a suitable container, such as a platinum crucible, and heated in an electrically heated furnace to a temperature of about 650-1400 degrees Celsius depending on the composition. The glass mixture may be placed in furnace and which allows the melting for the desired time in which the glass can be melted properly without any un-melted elements left behind. Step 1302 is carried out to allow sufficient melting temperature, melting time and preferably intermittent stirring to the glass mixture during melting.

The heated glass mixture may be quenched in a de-ionized water bath to form glass frits in step 1304. In some embodiments, the melted glass mixture may be caste into a container filled with ambient temperature de-ionized water. Preferably, the glass frits may be ground to have a particle size of 2-10 μm.

Next, the glass frits may be sintered with a hollow cylinder shape which can be fit into a conduit 12 of a metal shell 11 in step 1305. In some embodiments, a metal web 41 may be disposed in the shell conduit 12 and the glass frits may be sintered with a hollow cylinder shape which can be fit into the metal web 41 optionally using a burn-off polymer binder.

The sintered glass frits may be positioned in the metal shell 11 and may be fired at first temperature ($T_1$) for a first time period to form an electrical feedthrough assembly (downhole electrical feedthrough 100) having a dielectric seal 21, 26, and to provide a first thermal energy to the dielectric seal in step 1306. In some embodiments, Ti may be between approximately 300-400 degrees Celsius and a first time period may be between approximately 30 to 45 minutes.

Next in step 1307, the electrical feedthrough 100 comprising the dielectric seal 21, 26, may be heated at a second temperature ($T_2$) for a second time period to provide a second thermal energy to the dielectric seal 21, 26. In some embodiments, $T_2$ may be between approximately 480-650 degrees Celsius and a second time period may be between approximately 20 to 45 minutes.

In step 1308 the electrical feedthrough 100 may be cooled to ambient temperature for a third time period. In some embodiments, ambient temperature may be approximately 20-25 degrees Celsius. In further embodiments, cooling the dielectric seal 21, 26, in the metal shell 11 may be accomplished with a quenching process having a fast cooling rate ($\eta_1$) to produce a hydrophobic multi-phase (δ-phase and α-phase) mixed dielectric sealing material so that the third time period may be relatively short and between approximately 0.40 to 0.75 hours. In alternative embodiments, cooling the dielectric seal 21, 26, in the metal shell 11 may be accomplished with a slow cooling rate ($\eta_2$) to produce a high dielectric and hydrophobic α-phase dominated dielectric sealing material so that the third time period may be relatively long and between approximately 5 to 12 hours.

In step 1309 two isolators 31, 36, may be integrated into the shell conduit 12 so that the dielectric seal 21, 26, is in contact with at least one of the isolators 31, 36. In some embodiments, integrating polymer isolator 31, 36, into the shell conduit 12, may include injecting a (preferably PAI and/or PEEK thermoplastic) polymer material into the shell conduit 12 after glass-to-metal seal fabrication process is completed by injection molding process, including plasticizing, injection, cooling, and ejection from the electrical feedthrough package 100. In other embodiments, integrating polymer isolator 31, 36, into the shell conduit 12, may include using "press and shrink fits" to have machined (preferably PAI and/or PEEK thermoplastic) polymer cylinder with tiny holes for conducting pin 13 penetration first, and inserting the polymer cylinder into the shell conduit 12 at a low-temperature ($T_{low}$=−60 degrees Celsius) controlled environment chamber. Since this injection molding is following the glass-to-metal seal process, the thermoplastic isolators 31, 36, have an amount compression provided by the CTE mismatch between Inconel metal shell 11 and polymer material at elevated temperature. After step 1309, the method 1300 may finish 1310.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A downhole electrical feedthrough package, the feedthrough package comprising:
a metal shell forming a shell conduit;
a metal web coupled to the metal shell, the metal web forming a web conduit;
a conducting pin extending through the shell conduit and web conduit;
a dielectric seal electrically isolating the conducting pin from the metal web, the dielectric seal formed by a bismuth glass based dielectric sealing material system;
a first isolator disposed within the shell conduit proximate to a front side of the dielectric seal and surrounding a portion of the conducting pin; and
a second isolator disposed within the shell conduit proximate to a rear side of the dielectric seal and surrounding a portion of the conducting pin.

2. The feedthrough package of claim 1, wherein the bismuth glass based dielectric sealing material system comprises of binary $Bi_2O_3$-MO compositions, wherein MO is selected from the group consisting of ZnO, BaO, $TiO_2$, and $Fe_2O_3$, and their glass making pre-cursors.

3. The feedthrough package of claim 1, wherein the bismuth glass based dielectric sealing material system comprises of ternary $Bi_2O_3$—$B_2O_3$-MO compositions, wherein MO is selected from the group consisting of ZnO, BaO, $TiO_2$, $Fe_2O_3$, and their glass making pre-cursors.

4. The feedthrough package of claim 1, wherein the bismuth glass based dielectric sealing material system comprises of quaternary $Bi_2O_3$—$B_2O_3$-MO-REO compositions, wherein MO is selected from the group consisting of ZnO, BaO, $TiO_2$, $Fe_2O_3$, and their glass making precursors, and REO is selected from the group consisting of $CeO_2$, $Y_2O_3$, $Sc_2O_3$, $Nd_2O_3$, $Pr_2O_3$, and lanthanum series oxides.

5. The feedthrough package of claim 1, wherein $B_2O_3$ is between 0 mol % to 40 mol %.

6. The feedthrough package of claim 1, wherein REO is between 0 mol % to 15 mol %.

7. The feedthrough package of claim 1, wherein MO is between 0 mol % to 35 mol %.

8. The feedthrough package of claim 1, wherein $Bi_2O_3$ is between 20 mol % to 60 mol %.

9. The feedthrough package of claim 1, wherein the dielectric seal comprises a glass transition temperature of approximately from 350 degrees Celsius to 480 degrees Celsius, coefficient of thermal expansion from $8.0 \times 10^{-6}$ m/m·K to $12 \times 10^{-6}$ m/m·K, Young's modulus from 50 GPa to 65 GPa, a mass density of approximately from 5.5 g/cm$^3$ to about 7.0 g/cm$^3$, and resistivity from $1.0 \times 10^{11}$ Ω-cm to $1.0 \times 10^{14}$ Ω-cm.

* * * * *